Sept. 18, 1928.
A. A. ALEXANDER
FLYWHEEL
Filed Aug. 8, 1922
1,684,568
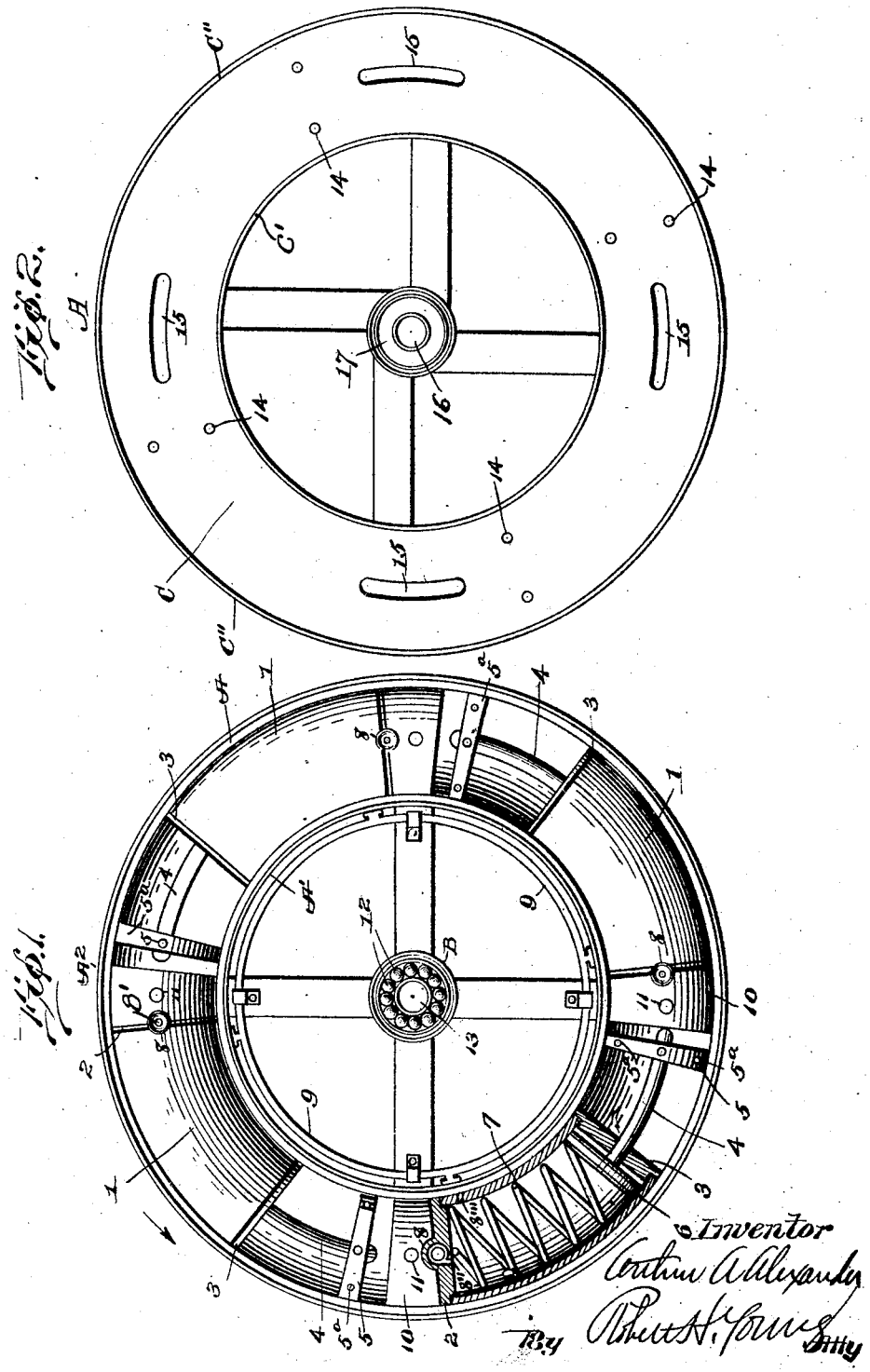

Patented Sept. 18, 1928.

1,684,568

UNITED STATES PATENT OFFICE.

ARTHUR A. ALEXANDER, OF NEW YORK, N. Y.

FLYWHEEL.

Application filed August 8, 1922. Serial No. 580,428.

My invention relates in general to transmission devices, and more particularly to a novel type of fly wheel which is particularly adapted for use in connection with motor driven vehicles. My device, however, is not limited to such construction and use, but is readily adaptable for use in combination with all kinds of transmission devices involving gears, sprockets, pulleys, shock absorbers and the like.

In all transmission devices wherein a friction clutch is utilized, a considerable shock is imparted to the mechanism when the clutch is brought into function suddenly or carelessly. I am aware that others have realized the disadvantages of a transmission device which would permit such shock to be transmitted throughout the whole system to be served and have sought to obviate the shock effect by the interposition of spring members between the driving and driven elements. Such devices are objectionable in that the resistance of a spring to expansion or compression is unvarying at all points of expansion or compression within the elastic limit of the spring employed. If this limit is exceeded elastic fatigue of the spring sets in, all resiliency ceasing and the spring itself is destroyed. Such a spring would tend, if stressed, to rebound suddenly, and, in the case of such a device being used in connection with the transmission of a motor vehicle, if the spring is sufficiently strong to bear the load, the rebound will stall the motor of the motor vehicle.

It is my purpose to provide a means for absorbing such a shock comprising one or more pneumatic shock absorbing means which will offer a gradual increasing resistance to the load up to a point short of the complete liquefaction of the air or to the other pneumatic medium employed. The load which would be imposed upon such a pneumatic shock absorbing device would in no case ever reach such a magnitude as to cause liquefaction. Such a pneumatic device would also offer a rebound effect of gradually decreasing force rather than a sudden shock. Suddenness of shock, both of initiation of stress and rebound from stress are thus avoided by my structure.

These and other objects of my invention will appear in the accompanying specification and claims and disclosed in the accompanying drawings, in which:

Figure 1 is an elevation partly in section of one of the members of my shock-absorbing device, and Figure 2 is a similar elevation of the complementary member thereto.

Referring in greater particularity to the drawings, A represents a hollow rim of hemispherical cross section of that part of the fly wheel which is attached to the crank shaft of a motor driven vehicle. This rim may be integral with or fastened to the rim of the fly wheel. The inner and outer edges of the hollow of this rim A are provided with flanges A' and A², extending inwardly and are adapted to mesh with the annular groove of such inner and outer edges of the other end of the fly wheel, shown in Fig. 2 and designated as C' and C''. The object of the annular flanges and grooves are to enclose fully the mechanism in the hollow rims and hubs of the fly wheel halves and to steady the action of the component parts. Obviously any other enclosing and steadying means answering the same purpose might be utilized without departing from the spirit of my invention.

In the preferred embodiment of my invention I have shown a plurality of pneumatic cylinders 1, arcuate in form, concentric with the axis of the fly wheel, and attached to the inner surface of the rim A', so that about one half of its outside diameter protrudes above the hollow rim. In the modification illustrated I have shown four such cylinders, one of them in longitudinal cross section.

The construction of these cylinders will be seen to be as follows: A bottom plate 2 and a top plate 3 are provided for each cylinder, the top plate 3 having a centrally located aperture to admit and allow for the passage of the arcuate piston rod 4. On the inner end of the piston rod 4 there is fastened a piston 6 of relatively small lateral area, the lateral surfaces of this piston being arcuate in shape to enable the piston 6 to fit snugly against the interior wall of the cylinder 1. A light compression swing 7, impinging at one end against the bottom plate 2 and at the opposite end against the piston 6, is provided to assist in assuring the speedy return of the piston to an expanded position after the transmission shaft has been relieved of its load.

In the bottom plate 2 there is provided an air intake valve 8 preferably extending inwardly at right angles to the major axis of the cylinder and provided with air ports 8' and 8″, leading respectively into the outer air and into the cylinder itself. This air valve or more properly air check valve is so designed as to close on the compression stroke of this piston in its cylinder and to open on the expansion stroke thereof in the usual manner of an ordinary check valve which freely permits passage of air therethrough in one direction, but closes against passage of air therethrough in the opposite direction.

Attached to the outward end of the piston rod is a guide block 5, circular in cross section, operating loosely in the hollow of the rim A, but provided with screw holes 5ª to receive screws to connect it to the other half of the fly wheel C at the points indicated at 14.

An equalizer tube 9, suitably affixed to the inner periphery of the hollow rim A and connected with all of the cylinders by suitable ports 8‴, is provided. The function of this equalizer 2 is to equalize the pressure in all of the cylinders and thereby provide for an equal distribution of load and reduction of wear on parts. At 10 there are shown blocks also circular in cross section rigidly fastened to the inner surface of the rim A, or integral with said rim, said blocks being provided with a stud or bolt hole 11 to receive a stud or bolt of the part C to connect the two halves of the fly wheel A and C together. The bottom plate of the cylinder is adapted to engage with and be readily secured to the block 10.

For purposes of clarity of description I will refer in the future to that portion of the fly wheel shown in Fig. 1 as being the casing and driving member, or that member which is attached to the engine; and the portion shown in Fig. 2 as a driven member, or that part connected to the transmission train. Obviously the piston and cylinders could be located in either of the halves of the fly wheel, the complementary parts being located in the other half thereof.

The driving portion of the fly wheel is provided with a hallow extension hub to carry a bearing 12 for the end of the transmission shaft which is journaled at 13. Referring more particularly to Fig. 2, the driven or transmission half of the fly wheel is reverse hollowed at C for its entire circumference so as to form a hollow cover wherein the cylinders and the guide blocks may slide easily. This section of the fly wheel is provided with suitable holes 14 through which suitable screws or bolts enter the recesses heretofore mentioned in the guide blocks 5. This hollow rim is further provided with arcuate slots 15 to allow for the passage of studs or bolts entering the stud holes 11 in the block 10 and permitting twisting action of the driven half of the fly wheel in operating the cylinders. The length of these slots will limit the degree of compression in the cylinders and the material at the end of the slots will take up the load in case of the failure of any part of the cylinders or pistons.

The hub of the driven half of the fly wheel is hollow to carry the ball race 17 for the bearings 12 of the driving half of the fly wheel. At 16 there is shown an axial hole passing through the hub to allow for the passage of the end of the transmission shaft which is to be fastened securely to the driven fly wheel half C and which is journaled to the driving portion A, as heretofore mentioned, at 13.

I have shown in the drawings the bearing in which the end of the transmission shaft is journaled as ball bearing to minimize the friction of the engine half of the fly wheel in revolving around that shaft when such shaft is not transmitting power. A similar form of construction will adapt my device to machine elements such as pulleys, sprockets and gears.

From the foregoing description my device will be seen to operate as follows. As long as no load is put upon the source of power, the engine in case of a motor vehicle, the engine or power half of the fly wheel will continue to function as does the ordinary fly wheel. As soon as any load is put upon the engine or the source of power, as by meshing the gears and letting in the clutch of an automobile, the air in the cylinders of the fly wheel rim will be compressed by the temporary reverse action due to the inertia of the transmission half of the fly wheel until the resistance to further compression balances the load. Supposing the driving portion of the fly wheel A is rotating in the direction indicated by the arrow in Fig. 1, when the load is applied, the stud bolts or screws 14 being rigidly secured to the guide blocks 5 which in turn is rigidly secured to the ends of the piston shaft 4, the inertia due to the weight of the transmission half of the fly wheel C, together with the weight of the load carrier by it will cause the piston 6 to move, relatively, in a direction opposite to that indicated by the arrow in Fig. 1, with the result that the air in the cylinder 1 will be compressed as hereinbefore described. The expanding force of the compressed air together with the resistancy of the spring 7 will tend to force the piston 6 back into the position shown in Fig. 1 when the inertia of the transmission half of the fly wheel and its load are balanced.

While the device is disclosed in this specification and drawings as a preferred embodiment of my invention it is obvious that my device is not limited to any such construction but is capable of all the variations within the limits of the broad inventive idea contained therein.

I claim:

1. In a resilient transmission device, a fly wheel comprising a co-axial driving portion and a driven portion, a pneumatic resilient device between said driving portion and said driven portion, said pneumatic resilient device comprising a plurality of arcuate cylinders affixed to said driving member, pistons within said arcuate cylinders, piston rods fixedly attached to said pistons, a guide block fixedly attached to each of said piston rods outside of said cylinders, said guide block being adapted to bear in said driving portion and in said driven portion, and means fixedly connecting said driven portion to said guide blocks whereby said pistons will be operated in said cylinders prior to the communication of motion to said driven member by said driving member.

2. In a resilient transmission device, a fly wheel comprising a co-axial driving portion and driven portion, a pneumatic resilient device between said driving portion and said driven portion, said pneumatic resilient device comprising a plurality of arcuate cylinders affixed to said driving member, a piston within each of said arcuate cylinders, a piston rod fixedly attached to each of said pistons, a guide block fixedly attached to each of said piston rods outside of said cylinders, said guide block being adapted to bear in said driving portion and in said driven portion, and means fixedly connecting said driven portion to said guide blocks whereby said pistons will be operated in said cylinders for overcoming the inertia of said driven member by said driving member.

3. In a transmission device comprising a driving member and a driven member, an annular channel in the rim of said driving member, a plurality of arcuate cylinders housed in said channel, suitable pistons operatively mounted in said cylinders, a shaft co-axial with said driving member, a wheel-shaped member affixed to said shaft, and suitable connecting means between said wheel-shaped member and said pistons so that the air contents of such cylinders will be compressed in overcoming the inertia of said shaft.

4. In a shock absorbing device, a casing, a plurality of arcuate pneumatic cylinders contained in said casing, pistons operatively mounted in said cylinders, a cover for said casing having a shaft co-axial with and journaled in said casing, suitable connecting means between said cover and said pistons so that said pistons are operated in said cylinders whenever there is relative motion between said casing and said cover.

5. In a power transmission device, a driving member and a driven member, pneumatic resilient means between said driving member and said driven member, said resilient means comprising a plurality of cylinders mounted on one of said members, pistons operatively mounted in said cylinders, means operatively connecting one of said members to said pistons so that the air contents of said cylinders will always be in a state of continuous compression in overcoming the inertia of said driven member, and means for equalizing the pressure within said plurality of cylinders.

In testimony whereof I have affixed my signature.

ARTHUR A. ALEXANDER.